(12) United States Patent
McGuire, Jr.

(10) Patent No.: US 6,602,373 B1
(45) Date of Patent: Aug. 5, 2003

(54) ADHESIVE SYSTEM AND METHOD OF USING SAME

(75) Inventor: James E. McGuire, Jr., Powell, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/859,228

(22) Filed: May 16, 2001

(51) Int. Cl.⁷ ............................................... B32B 31/00
(52) U.S. Cl. .................... 156/152; 156/313; 442/65; 442/151
(58) Field of Search ................ 442/65, 151; 156/313, 156/152; 427/208

(56) References Cited

U.S. PATENT DOCUMENTS

| | | | |
|---|---|---|---|
| 2,599,359 A | * | 6/1952 | Banks et al. ............... 156/313 |
| 3,190,178 A | | 6/1965 | McKenzie |
| 4,025,159 A | | 5/1977 | McGrath |
| 4,248,748 A | | 2/1981 | McGrath et al. |
| 4,486,363 A | | 12/1984 | Pricone et al. |
| 4,618,518 A | | 10/1986 | Pricone et al. |
| 4,763,985 A | | 8/1988 | Bingham |
| 4,844,973 A | * | 7/1989 | Konishi et al. ............. 442/149 |
| 5,069,964 A | | 12/1991 | Tolliver et al. |
| 5,736,470 A | * | 4/1998 | Schneberger et al. ....... 442/151 |
| 5,820,988 A | | 10/1998 | Nagaoka |
| 6,121,166 A | * | 9/2000 | Wood et al. ................ 442/151 |

FOREIGN PATENT DOCUMENTS

GB    2263434 A  *  7/1993

\* cited by examiner

*Primary Examiner*—Jeff H Aftergut
(74) *Attorney, Agent, or Firm*—Jones Day

(57) ABSTRACT

An adhesive system comprises two layers of adhesive, one layer being relatively thin and the other being optionally thicker, being separated by a permeable web. The relatively thin layer of the adhesive system provides a relatively weak initial bond between a substrate and an object to be adhered to a substrate, so that the object can be repositioned on the substrate if desired. Pressure is then applied to make the two layers of adhesive come into contact with one another through the permeable web, such that the layers function as an integral layer to provide a strong bond. The permeable web also provides tensile strength and structural support for brittle or extensible articles.

37 Claims, 1 Drawing Sheet

ADHESIVE SYSTEM AND METHOD OF USING SAME

FIELD OF THE INVENTION

This invention relates to an adhesive system for adhering an object to a substrate, and in particular relates to an adhesive system that allows for repositioning of the object after its first contact with the substrate to which it is to be adhered.

BACKGROUND OF THE INVENTION

When an object is adhered to a substrate, commonly it is necessary to reposition the object after it first makes contact with the substrate to which it is to be adhered. One example is in the manufacture of traffic signs, in which the object to be adhered is a piece of plastic sheeting sign material, and the substrate is a sign blank. Another example is the manufacture of plastic barrels that are covered in whole or in part with a brightly colored and/or reflective plastic sheeting material and used to delineate roadway construction work zones. The object to be adhered is plastic sheeting, typically provided as a roll of material, the reverse side of which is provided with a layer of a pressure sensitive adhesive and a release liner, and the substrate is the outer surface of the barrel. To adhere the plastic sheeting material to the barrel substrate, an amount of the sheeting is unwound from the roll, the release liner is peeled off the back, the adhesive side of the sheeting is applied to the substrate, and the piece of sheeting is pressed into place. If the sheeting is not properly aligned on the substrate when the adhesive first contacts the substrate surface, the sheeting must be removed from the substrate and re-applied in proper alignment.

Typically, plastic sheeting materials used on traffic signs and plastic barrels are retroreflective. Such retroreflective sheeting materials can be of the cube corner type as disclosed, for example, in U.S. Pat. No. 4,486,363 (Pricone) and U.S. Pat. No. 4,618,518 (Pricone); or such sheeting materials can be of the glass bead type, as disclosed, for example, in U.S. Pat. No. 3,190,178 (McKenzie) and U.S. Pat. No. 4,025,159 (McGrath). In the case of construction work zone barrels, preferred types of sheeting include those known in the industry as reboundable sheeting products, described in ASTM D 4956. Prior art adhesives for use with retroreflective sheeting include, for example those disclosed in U.S. Pat. No. 4,248,748 (McGrath), U.S. 5,069,964 (Tolliver et al.), U.S. Pat. No. 4,763,985 (Bingham), and U.S. Pat. No. 5,820,988 (Nagaoka). The substrate can be a metal such as aluminum, but in recent years such barrels and sign substrates have been made of plastic, especially polyolefins such as polyethylene and polypropylene. The use of plastic substrates helps to reduce damage or injury that might result from flying debris in the event of a collision with an oncoming vehicle.

The use of plastic substrates has given rise to certain difficulties in adhering the sheeting material to the substrate. Adhesives that have been adequate in the past to adhere retroreflective sheeting to a flat aluminum sign substrate do not form a strong bond between a retroreflective sheeting product and a plastic substrate having a low surface energy, particularly when the substrate is a curved surface, such as the side of a construction zone barrel. A weak bond between the sheeting material and the substrate can create two difficulties. First, the sheeting may tend to suddenly pull away from the substrate upon impact, particularly under freezing weather conditions. Second, expansion and contraction of the plastic substrate during cycles of hot and cold temperatures can create shear forces that can cause the sheeting to delaminate from the substrate.

Attempts to solve this problem in the past have involved the use of extremely tacky and aggressive adhesives, such as certain synthetic rubber formulations with a strong affinity for low surface energy plastics. While the use of such adhesives can provide a satisfactory bond between the sheeting and the substrate, other difficulties can arise in the process of applying the sheeting to the substrate. In particular, if the sheeting is not placed on the substrate in perfect alignment in the first instance, it can not be lifted off the substrate to be repositioned without permanently damaging the sheeting product.

It is one object of the invention to provide an adhesive that will provide a bond between an object and a substrate, and will allow the object to be repositioned after initial contact with the substrate.

It is an object of the invention to provide an adhesive system that will provide a bond between a plastic sheeting material and a plastic substrate, and will allow the plastic sheeting to be repositioned after initial contact with the plastic substrate.

It is yet another object of the invention to provide an adhesive system that will resist sudden separation of the material and the substrate upon impact, particularly under freezing conditions.

It is still another object of the invention to provide an adhesive system that will resist delaminating of the material from the substrate when subjected to shear forces arising from expansion and contraction occurring during thermal cycling.

SUMMARY OF THE INVENTION

In accordance with the invention, an adhesive system is provided comprising a first relatively thin layer of adhesive, a second layer comprising a permeable web, and a third layer of adhesive that is optionally thicker than the first layer. The adhesive is preferably one suitable for bonding to low-surface energy materials such as certain plastic substrates. The permeable web is preferably made of a fibrous material, and even more preferably of a fibrous non-woven material.

The adhesive system of the instant invention is applied to a material such that the third layer of the system is disposed against the rear surface of the material to be adhered to the substrate, and such that the relatively thin first layer of the system will be disposed against the surface of the substrate. When the object with the adhesive system on its rear surface is first applied to the substrate, only the relatively thin first layer of the system initially bonds to the substrate surface. Because the tackiness of the first layer is a function of its thickness, the initial bond between the adhesive system and the substrate will be relatively weak so that the object can be lifted off the substrate and reapplied if repositioning is necessary for proper alignment. When the object is on the substrate in the desired position, the object is pressed into place. The applied pressure causes the first relatively thin adhesive layer and the third optionally thicker adhesive layer to come into contact with one another through the second layer comprising the permeable web. The system then acts as a single thick layer of adhesive that provides a very strong bond between the object and the underlying substrate. In an embodiment of the system for use with retroreflective sheeting materials, the resulting bond is strong enough to resist sudden separation of the material from the substrate, even upon impact under freezing conditions. The system also resists delaminating of the material from the substrate, even after the substrate has undergone expansion and contraction due to thermal cycling.

DESCRIPTION OF THE PREFERRED EMBODIMENT

Figure 1:
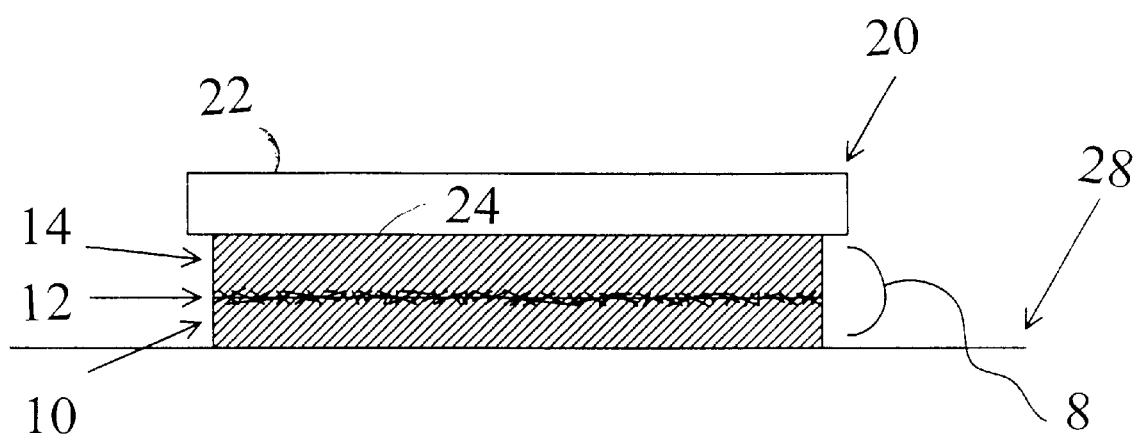
FIG. 1 is a cross-sectional view of the adhesive system of the instant invention disposed between a retroreflective sheeting and a substrate.

The adhesive system 8 of the instant invention is illustrated in FIG. 1, and comprises a first relatively thin layer 10 of an adhesive, a second layer 12 comprising a permeable web, and a third layer 14 of the adhesive, optionally thicker than the first layer. In the illustrated embodiment, the article 20 to be adhered to a substrate surface 28 is a piece of reflective sheeting material having a front surface 22 and a rear surface 24; rear surface 24 is bonded with the adhesive system to a substrate surface 28. The adhesive system is disposed between the sheeting material and the substrate such that the first relatively thin layer 10 of the adhesive system is disposed against the substrate 28 and the third optionally thicker layer 14 of the adhesive system is disposed against the rear surface 24 of the reflective sheeting.

The thickness of the first relatively thin layer 10 can be in the range of about 10–100 microns, more preferably is in the range of about 20–70 microns, and most preferably is in the range of about 30–50 microns. The thickness of the third optionally thicker layer 14 can be in the range of about 10–200 microns, more preferably is in the range of about 25–75 microns, and most preferably is in the range of about 50–60 microns.

The selection of the particular adhesive will depend on the intended use of the adhesive system. Adhesives suitable for use in the instant invention with a substrate having a low surface energy include synthetic rubber based adhesives such as styrene butadiene rubber, styrene isoprene styrene, styrene butadiene styrene and blends thereof; tackified acrylates; and silicone based adhesives. Examples of preferred synthetic rubber based adhesives include Adtac 5001 available from Ashland Chemical Company of Dublin, Ohio; Adtac 5501 available from Ashland Chemical Company of Dublin, Ohio; and entrotech ecr-122 available from entrotech, inc. of Columbus, Ohio. An example of a preferred tackified acrylate includes eca-121 available from entrotech, inc. of Columbus, Ohio; and an example of a preferred silicone based adhesive includes Silgrip PSA 590 from GE Gayer Silicones of Waterford, N.Y. Adhesive formulations suitable for use with the instant invention may also include tackifiers, plasticizers, and anti-oxidants, as is known in the art. The adhesive formulations can be blended in toluene or another suitable solvent system. The adhesive formulations used in layer 10 and layer 14 need not be identical.

The permeable web that forms the second layer 12 of the adhesive system of the instant invention functions to allow the adhesive of the first layer 10 and the third layer 14 of the system to come into contact with each other through the permeable web when pressure is applied to the exterior of the sheeting material after it is applied to substrate so as to function as a single integral layer, when pressure is applied to the front surface 22 of the article 20 being adhered to substrate surface 28. Second layer 12 is preferably formed of a permeable web of a fibrous material, and even more preferably of a fibrous non-woven material. Fibrous non-woven materials suitable for use as second layer 12 of the adhesive system of the instant invention include the polyester non-woven material sold under the trade name "Reemay" by Reemay Inc. of Old Hickory, Tenn. Other materials suitable for use as second layer 12 include non-woven carriers made of fibers based on nylon 66, polypropylene, polyethylene, glass fibers, aramid fibers, and carbon fibrils.

One method of manufacturing the adhesive system of the instant invention comprises the step of casting a layer of adhesive on a first release liner, laminating the permeable web to the layer of adhesive, casting a layer of adhesive over the permeable web, and applying a second release liner to the exposed surface of the adhesive. It will be appreciated that in this method, either the first relatively thin layer can be cast first, with the second web layer then laminated to the first relatively thin layer and the third optionally thicker layer cast over the second permeable web layer; or, the third optionally thicker layer can be cast onto a release liner first, the second web layer can be then laminated to the third layer, and the first relatively thin layer can be then cast over the second permeable web layer. An alternative method of manufacturing the adhesive system of the instant invention is to prepare it directly on the object that is to be adhered to a substrate. If the object is a sheeting product, then the third optionally thicker layer of adhesive is cast first onto the rear surface of the sheeting, the second layer comprising the permeable web is then laminated over the third layer, and the first relatively thin layer is then cast over the second layer comprising the permeable web. A release liner is then applied over the first reatively thin layer of adhesive, and the sheeting can be wound on a core for storage and shipment until needed.

Manufacturing parameters of temperature, line speed, application rates and the like will depend upon the particular adhesive used, and its rheological and other processing properties; the properties of the material on which the adhesive system is prepared; and variables in the manufacturing environment such as oven type, oven length, ambient temperature, ambient atmosphere conditions, and the like. Those skilled in the adhesive arts, and particularly in the art of applying adhesive compositions to moving webs, will know and understand how to establish manufacturing parameters to account for these variables.

The adhesive system of the instant invention is advantageously easy to use. Depending on the particular manufacturing application, the inventive adhesive system is first applied either to the substrate to which the object is to be adhered, or to the object itself. In either case, the adhesive system is applied such that first relatively thin layer 10 is exposed. The object is then placed against the substrate, with the adhesive system disposed therebetween. Relatively thin layer 10 provides a weak initial bond. This initial bond preferably has a peel strength, as measured by ASTM D1000, of less than about 45 Newtons/mm, more preferably less than about 35 Newtons/mm, and most preferably less than about 30 Newtons/mm. The weak initial bond allows the object to be removed from the substrate without damage to either the object or the substrate. When the object is in the final desired position on the substrate, the substrate and the object are pressed together such that the adhesive of layer 10 and the adhesive of layer 14 come into contact with one another through permeable web 12, forming a strong bond between the object and the substrate.

One application for the invention adhesive system is in the manufacture of road signs. The adhesive system can be manufactured directly on the rear surface of sheeting used to manufacture signs. To manufacture a traffic sign, a piece of sheeting can be cut from the roll and trimmed to the desired size, and simply placed against a sign substrate. The relatively thin first layer of the adhesive will be in contact with the surface of the sign substrate, and will provide only a relatively weak initial bond between the sheeting and the substrate. The placement of the sheeting can be checked for proper alignment on the sign substrate. If the alignment is not satisfactory, then the weak initial bond provided by the first relatively thin layer of the adhesive system will allow a worker to simply lift the piece of sheeting off the substrate and reposition it as desired. Once the sheeting is aligned on the substrate in the desired position, the worker applies additional pressure to the exterior surface of the sheeting to cause the first and third layers of adhesive to come into contact with one another through the second permeable layer of the system. The first and third layers then function as a single integral layer of adhesive that forms a strong bond between the substrate and the article bonded thereto. The bond is strong enough to resist sudden separation in the event of impact, even under freezing conditions. The bond also resists delaminating of the article and the substrate after repeated expansion and contraction such as occurs during thermal cycling. The permeable web adds further support to the structure, by providing additional tensile strength, and by imparting stabilization in the event of differential expansion or contraction of the substrate and the article during thermal cycling.

The adhesive system of the instant invention also can be used with reflective sheeting materials for construction work zone barrels, such as reboundable sheeting products described in ASTM D 4956. Such sheeting can be applied to barrels by methods currently used in barrel shops. First the surface of the barrel can be treated with a flame treatment, an alcohol wipe-down, or other known surface treatment techniques. The barrel is then mounted on a device that allows the barrel to be spun on its axis. A roll of sheeting of appropriate width, typically about 4–6 inches, and having the adhesive system of the instant invention on its reverse surface, is brought into proximity with one end of the barrel. The end of the sheeting is unwound from the roll, and the release liner is peeled back. The end of the sheeting is applied to the barrel surface and pressed lightly in place. The barrel is turned on its axis, while the sheeting is unrolled and its release liner removed, so that the sheeting is applied to the barrel with an initial relatively weak bond. If the sheeting is out of alignment on the barrel, it can be lifted off and reapplied. After a full revolution of the barrel, the end of the sheeting is cut and the strip of sheeting is pressed firmly into place. Hand pressure is sufficient to cause the first and third adhesive layers of the adhesive system to flow together throughout the second permeable web layer, so that the adhesive system provides a strong bond between the sheeting and the barrel. This procedure is repeated along the length of the barrel until the barrel is covered with sheeting material as desired.

If the adhesive system of the instant invention is supplied between two release liners and not manufactured on the rear surface of a sheeting material, then the method of use will differ slightly. A piece of the adhesive system including the release liners is cut to the desired size. If desired, the adhesive system can be die-cut to predetermined size and shape, such as for industrial or consumer applications. The release liner adjacent the third optionally thicker layer of adhesive is removed first, and the pre-cut piece of the adhesive system is applied to the object to be adhered to the substrate with the exposed surface of the third layer of the system adjacent the rear surface of the article. The release liner adjacent the first relatively thin layer of the adhesive system is then removed, and the article is applied to the substrate with the exposed surface of the first relatively thin layer of adhesive adjacent the surface of the substrate. The object may be lifted off and repositioned as necessary until the desired alignment is obtained. The object is then pressed into place so that the first and third adhesive layers of the system flow together through the second permeable web layer, whereby the first and third layers will function as a single integral layer of adhesive, providing a strong bond between the article and the substrate.

In addition to use with retroreflective films for traffic signs and traffic safety applications, the adhesive system of the instant invention can be used in those applications in which the object to be attached to the substrate is either too brittle or too extensible to be repositioned after initial contact with the substrate without damage or deformation, yet which require an aggressive adhesive system for ultimate functionality. One such class of products is extensible films for decorative graphics applications. These include facestocks having graphic features that would be altered if the film were to be distorted during repositioning. Such applications include self adhesive printed media on extensible films based on polyolefins, polyvinyl chloride, polyvinyl fluoride, urethanes, and metallic foils. The tensile strength value of such films can range from less than about 1000 g/25 mm to up to about 5000 g/25 mm. Acrylate based adhesives, and substrates including metal, painted metals, and high surface energy plastics, are particularly suited to such applications of the instant invention, although use of the invention is not so limited. In such applications, the adhesive system of the instant invention can provide initial peel values of less than about 10 Newtons/25 mm, as measured by method ASTM D1000.

The adhesive system of the instant invention can also be used in reposition able hand applied foil tapes for sealing systems. In such sealing systems of the prior art, the difficulty of applying by hand is exacerbated by the elongation of the aluminum foil. Adhesive systems of the instant invention for use with such foil tape sealing systems can employ synthetic rubber or acrylates as the adhesives of the first and third layers. The differential adhesive and fiber support of the inventive adhesive system impart sufficient strength to the foil to allow for repositioning.

Other applications in which the instant invention will be useful include films having functional replicated surfaces, such as flexible circuits, microreplicated reaction vessels, optical films, microfluidics, and others.

In the following Example, the materials used in the adhesive formulation were Vector 4111 styrene isoprene styrene, available from Goodyear; Kraton D1102 styrene butadiene styrene available from Shell Chemical; Foral 85, Foral 105, and Hercolyn D tackifiers, each available from Hercules; Santicizer 141 plasticizer available from Solutia; and Irganox 1010 anti-oxidant available from Ciba Geigy.

EXAMPLE

A synthetic rubber adhesive composition is formulated as follows:

|  | Weight (grams) |
| --- | --- |
| Vector 4111 | 63 |
| Kraton D1102 | 35 |
| Foral 85 | 36 |
| Foral 105 | 100 |
| Hercolyn D | 10 |
| Santicizer 141 | 3 |
| Irganox 1010 | 2 |
| Toluene | 500 |

This composition is coated onto a release liner and dried in a 14-zone oven, at 20 seconds per zone, with the zone temperatures set as follows:

| zone 1 | 50° C. |
| --- | --- |
| zone 2 | 60° C. |
| zone 3 | 70° C. |
| zone 4 | 80° C. |
| zone 5 | 90° C. |
| zone 6 | 90° C. |
| zones 7–10 | 100° C. |
| zones 11–14 | 120° C. |

The finished layer is 50 microns thick. The residual toluene is less than 0.5 wt % of the adhesive composition. A web of Reemay non-woven polyester material is laminated to this layer, and the composite structure is run through a chill stack to reduce the temperature to 30° C., as is known in the art, and the structure is wound on a roll. Another layer of the same adhesive formulation is then coated on top of the non-woven web and dried as described above. The thickness of this adhesive layer is 75 microns. A second release liner is applied to the exposed adhesive, and the composite structure is then chilled to less than 30° C. and wound on a roll. If desired, this structure can be laminated to a sheeting article by removing the second release liner. In all steps, minimum lamination pressures are used. A sample of the adhesive system as described above is laminated to Avery Dennison reboundable retroreflective sheeting, and the sheeting is applied to a high density polyethylene flat test panel. After one minute, the adhesion is 30–35 Newtons/25 mm, as measured by ASTM D1000. This is low enough to allow the reboundable sheeting to be lifted off the substrate without damage to the sheeting. The substrate with the sheeting thereon is then subjected to an accelerated aging test by being maintained at 70° C. for 72 hours. After the accelerated aging, followed by equilibration at room temperature for one hour, the sheeting can not be lifted off the substrate without tearing the sheeting.

There has been disclosed an adhesive system that allows an article to be positioned and then repositioned on a substrate so that desired alignment can be achieved, yet provides a strong bond between the article and the substrate to resist sudden separation upon impact, and to resist delaminating of the article from the substrate even after expansion and contraction caused by repeated thermal cycling. The adhesive system of the instant invention will find particular utility in the manufacture of products for the highway safety industry, such as traffic signs, construction work zone signs, and construction work zone barrels, in which the substrate material is often a low surface energy plastic material. Other applications include decorativegraphics and tapes for sealing systems. It will be appreciated, however, that potential applications of the instant invention are not so limited. For example, the adhesive system of the instantinvention can be applied in the automotive industry, the furniture industry, the appliance industry, and any other application in which it is desired to be able to reposition an object being adhered to a substrate. Further, while particular formulations and materials have been disclosed herein for the adhesives of the first and third layers and the permeable web of the second layer of the adhesive system of the invention, the invention is not limited to the particular formulations and materials disclosed. Those skilled in the art will recognize that other formulations and materials can be used depending on the nature of the substrate and the article to be adhered to the substrate. Further, while the adhesive formulations of the first and third layers should be compatible, they need not be identical, and can be chosen based on the material of the article and substrate to which they are intended to adhere. Thus, although the invention has been described with reference to preferred embodiments presently contemplated, workers skilled in the art will recognize that changes may be made in form and detail without departing from the spirit and scope of the invention.

I claim:

1. A method of adhering an object to a substrate, comprising providing on a surface of said object an adhesive system comprising a) a layer of adhesive disposed against said surface, b) an adhesive-permeable web having one surface disposed against said layer of adhesive, and c) a relatively thin layer of adhesive disposed against the opposite surface of said adhesive-permeable web;

positioning said object against said substrate such that said relatively thin layer of adhesive provides a releasable bond between the object and the substrate; and applying sufficient pressure to said adhesive system such that said layers of adhesive flow together through said adhesive-permeable web to finction as an integral adhesive layer that provides a non-releasable bond between the object and the substrate.

2. The method of claim 1 comprising the further steps, prior to the application of pressure to said adhesive system of removing said object from said substrate and repositioning said object against said substrate, with said relatively thin layer of adhesive adjacent a surface of said object.

3. A method of adhering a sheeting article to a substrate, comprising providing on a surface of said sheeting article an adhesive system comprising a) a layer of adhesive disposed against said surface, b) an adhesive-permeable web having one surface disposed against said layer of adhesive, and c) a relatively thin layer of adhesive disposed against the opposite surface of said adhesive-permeable web;

positioning said sheeting article against said substrate such that said relatively thin layer of adhesive forms a releasable bond between said sheeting article and said substrate;

applying sufficient pressure to said adhesive system such that said layers of adhesive flow together through said adhesive-permeable web to finction as an integral adhesive layer that forms a non-releasable bond between said sheeting article and said substrate.

4. An adhesive system for adhering an object to a substrate, said adhesive system comprising, a first layer, a second layer, and a third layer, wherein:

a) said first layer comprises a relatively thin layer of adhesive, said thin layer providing a releasable bond between said object and said substrate, and b) said second layer comprises an adhesive-permeable web, and c) said third layer comprises adhesive, said second layer being disposed between said first layer and said third layer, such that when pressure is applied to said adhesive system, the adhesives of said first and third layers come into contact through said second layer to function as an integral adhesive layer, thereby providing between the object and the substrate a non-releasable adhesive bond.

5. The adhesive of claim 4 wherein the adhesive of said first layer is selected from the group consisting of synthetic rubber based adhesives, tackified acrylates, and silicone based adhesives.

6. The adhesive system of claim 5 wherein said synthetic rubber based adhesives are selected from the group consisting of styrene butadiene rubber adhesives; styrene isoprene styrene adhesives, styrene butadiene styrene adhesives, and blends thereof.

7. The adhesive system of claim 4 wherein the adhesive of said third layer is selected from the group consisting of synthetic rubber based adhesives, tackified acrylates, and silicone based adhesives.

8. The adhesive system of claim 7 wherein said synthetic rubber based adhesives are selected from the group consisting of styrene butadiene rubber adhesives; styrene isoprene styrene adhesives, styrene butadiene styrene adhesives, and blends thereof.

9. The adhesive system of claim 4 wherein said permeable web comprises a fibrous material.

10. The adhesive system of claim 9 wherein said permeable web comprises a fibrous non-woven material.

11. The adhesive system of claim 9 wherein said permeable web comprises fibers selected from the group consisting of polyester, nylon 66, polypropylene, polyethylene, glass fibers, aramid fibers, and carbon fibrils.

12. The adhesive system of claim 4 wherein said first relatively thin layer has a thickness in the range of about 10–100 microns.

13. The adhesive system of claim 12 wherein said first relatively thin layer has a thickness in the range of about 20–70 microns.

14. The adhesive system of claim 13 wherein said first relatively thin layer has a thickness in the range of 30–50 microns.

15. The adhesive system of claim 4 wherein said third layer has a thickness of about 10–200 microns.

16. The adhesive system of claim 15 wherein said third layer has a thickness of about 25–75 microns.

17. The adhesive system of claim 16 wherein said third layer has a thickness of about 50–60 microns.

18. The adhesive system of claim 4 wherein said first relatively thin layer of adhesive provides a peel strength of less than about 45 Newtons/mm as measured by ASTM D1000.

19. The adhesive system of claim 18 wherein said first relatively thin layer of adhesive provides a peel strength of less than about 35 Newtons/mm as measured by ASTM D1000.

20. The adhesive system of claim 19 wherein said first relatively thin layer of adhesive provides a peel strength of less than about 30 Newtons/mm as measured by ASTM D1000.

21. Retroreflective sheeting article comprising the adhesive system of claim 4.

22. The article of claim 21 wherein said retroreflective sheeting is a reboundable sheeting.

23. A road sign comprising a substrate, a sheeting material, and the adhesive system of claim 4.

24. A construction work zone marker barrel comprising a sheeting material and the adhesive system of claim 4.

25. The construction work zone marker barrel of claim 21 wherein said sheeting material is a reboundable sheeting.

26. The construction work zone marker barrel of claim 25 wherein said barrel is a plastic barrel.

27. An article comprising an extensible film and the adhesive system of claim 4.

28. The article of claim 27 wherein said film is selected from the group consisting of polyolefins, polyvinyl chloride, polyvinyl fluoride, urethanes, and metallic foils.

29. At The article of claim 27 wherein said adhesive system comprises an acrylate based adhesive.

30. A sealing system comprising a tape having the adhesive system of claim 4 on one surface thereof.

31. The sealing system of claim 30 wherein said tape comprises a metal foil.

32. The sealing system of claim 30 wherein said tape comprises aluminum foil.

33. The sealing system of claim 30 wherein said adhesive system comprises an adhesive selected from the group consisting of a synthetic rubber adhesive and an acrylate adhesive.

34. The adhesive system of claim 4 further comprising a release liner disposed adjacent said first layer.

35. The adhesive system of claim 4 further comprising a release liner disposed adjacent said third layer.

36. An adhesive system for adhering a sheeting article to a substrate, said adhesive system comprising, a first layer, a second layer, and a third layer, wherein:

a) said first layer comprises a relatively thin layer of adhesive, said relatively thin layer being sufficient to releasable secure said sheeting to said substrate, b) said second layer comprises an adhesive-permeable web, and c) said third layer comprises adhesive, said second layer being disposed between said first layer and said third layer, such that when pressure is applied to said adhesive system, the adhesives of said first and third layers come into contact through said second layer to function as an integral adhesive layer, thereby providing a non-releasable bond between the sheeting article and the substrate.

37. A retroreflective sheeting article comprising an adhesive system for securing the sheeting article to a substrate, said adhesive system comprising, a first layer, a second layer, and a third layer, wherein:

a) said first layer comprises a relatively thin layer of adhesive, said relatively thin layer being sufficient to releasable secure said sheeting to said substrate, b) said second layer comprises an adhesive-permeable web, and c) said third layer comprises adhesive, said second layer being disposed between said first layer and said third layer, such that when pressure is applied to said adhesive system, the adhesives of said first and third layers come into contact through said second layer to function as an integral adhesive layer, thereby providing a non-releasable bond between the sheeting article and the substrate.

* * * * *

UNITED STATES PATENT AND TRADEMARK OFFICE
CERTIFICATE OF CORRECTION

PATENT NO. : 6,602,373 B1
DATED : August 5, 2003
INVENTOR(S) : McGuire et al.

It is certified that error appears in the above-identified patent and that said Letters Patent is hereby corrected as shown below:

Column 8,
Line 31, replace "provides" with -- provide --.
Line 35, replace "fiction" with -- function --.
Lines 40-41, replace "system of" with -- system, of --.
Line 59, replace "finction" with -- function --.

Column 10,
Line 14, remove "At".
Lines 37 and 54, replace "releaseable" with -- releasably --.

Signed and Sealed this

Twenty-eighth Day of December, 2004

JON W. DUDAS
*Director of the United States Patent and Trademark Office*